US009032433B2

(12) United States Patent
Kaftan

(10) Patent No.: US 9,032,433 B2
(45) Date of Patent: May 12, 2015

(54) PERSONALIZED AD INSERTION DURING START OVER SERVICE

(75) Inventor: Ilan Kaftan, Los Altos, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 1009 days.

(21) Appl. No.: 12/192,553

(22) Filed: Aug. 15, 2008

(65) Prior Publication Data

US 2010/0043022 A1 Feb. 18, 2010

(51) Int. Cl.
*H04N 7/10* (2006.01)
*H04N 7/025* (2006.01)
*H04L 29/06* (2006.01)
*G06Q 30/02* (2012.01)
*H04N 21/235* (2011.01)
*H04N 21/258* (2011.01)
*H04N 21/435* (2011.01)
*H04N 21/438* (2011.01)
*H04N 21/44* (2011.01)
*H04N 21/6405* (2011.01)
*H04N 21/6408* (2011.01)
*H04N 21/643* (2011.01)
*H04N 21/6437* (2011.01)
*H04N 21/647* (2011.01)
*H04N 21/81* (2011.01)

(52) U.S. Cl.
CPC ............ *H04L 65/4076* (2013.01); *G06Q 30/02* (2013.01); *H04N 21/235* (2013.01); *H04N 21/25883* (2013.01); *H04N 21/25891* (2013.01); *H04N 21/435* (2013.01); *H04N 21/4384* (2013.01); *H04N 21/44016* (2013.01); *H04N 21/6405* (2013.01); *H04N 21/6408* (2013.01); *H04N 21/64322* (2013.01); *H04N 21/6437* (2013.01); *H04N 21/64784* (2013.01); *H04N 21/812* (2013.01); *H04L 65/1089* (2013.01)

(58) Field of Classification Search
CPC .......... H04N 21/231; H04N 21/23424; H04N 21/4331; H04N 21/6405
USPC .................................. 725/32, 34–36
See application file for complete search history.

(56) References Cited

U.S. PATENT DOCUMENTS

| | | | |
|---|---|---|---|
| 7,720,432 B1 | 5/2010 | Colby et al. | |
| 2002/0078219 A1* | 6/2002 | Tate et al. | 709/231 |
| 2002/0087976 A1* | 7/2002 | Kaplan et al. | 725/34 |
| 2006/0026067 A1 | 2/2006 | Nicholas et al. | |
| 2006/0075449 A1* | 4/2006 | Jagadeesan et al. | 725/113 |
| 2008/0022347 A1* | 1/2008 | Cohen | 725/134 |
| 2008/0059724 A1 | 3/2008 | Stifter, Jr. | |
| 2008/0060002 A1* | 3/2008 | Noll et al. | 725/35 |
| 2008/0109557 A1 | 5/2008 | Joshi et al. | |
| 2008/0301745 A1* | 12/2008 | Liu et al. | 725/110 |

(Continued)

FOREIGN PATENT DOCUMENTS

WO WO 2007102147 A2 * 9/2007

OTHER PUBLICATIONS

U.S. Appl. No. 12/164,646, filed Jun. 30, 2008, Haberman et al.

(Continued)

*Primary Examiner* — Nasser Goodarzi
*Assistant Examiner* — Kyu Chae
(74) *Attorney, Agent, or Firm* — Wall & Tong LLP

(57) ABSTRACT

A method and apparatus is disclosed for inserting targeted/addressable advertisements into video streams delivered to users within the context of a start over service.

16 Claims, 9 Drawing Sheets

(56) References Cited

U.S. PATENT DOCUMENTS

| | | |
|---|---|---|
| 2008/0313669 A1 | 12/2008 | Acharya et al. |
| 2009/0083813 A1 | 3/2009 | Dolce et al. |
| 2009/0094639 A1* | 4/2009 | Haberman et al. .............. 725/34 |
| 2009/0307732 A1 | 12/2009 | Cohen et al. |
| 2009/0320084 A1* | 12/2009 | Azam et al. ................... 725/120 |

OTHER PUBLICATIONS

U.S. Appl. No. 12/164,703, filed Jun. 30, 2008, Haberman et al.

* cited by examiner

PERSONALIZED AD INSERTION DURING START OVER SERVICE

CROSS-REFERENCE TO RELATED APPLICATIONS

This application claims benefit of U.S. provisional patent application Ser. No. 60/977,788, filed Oct. 5, 2007, which is herein incorporated by reference. This application is related to Ser. No. 12/164,646, filed Jun. 30, 2008, entitled TARGETED/ADDRESSABLE ADVERTISEMENT INSERTION, and to Ser. No. 12/164,703, filed Jun. 30, 2008, entitled TARGETED/ADDRESSABLE ADVERTISEMENT USING A VLAN, which applications are herein incorporated by reference.

FIELD OF INVENTION

The present invention relates to Internet protocol television (IPTV) systems in general and, more particularly, to a method and apparatus for inserting targeted/addressable advertisements into video streams delivered to users.

BACKGROUND OF INVENTION

Deployment of Switched Digital Video (SDV) systems in the cable market has shown that at any given time only 50-60% of the available content line-up needs to be delivered to a service group (e.g. about 1000 set top boxes or STBs). The delivery of content is typically provided via a multicast content delivery stream which includes both content and advertising. Default or network advertising is included within a multicast content delivery stream provided by a content source or network server. Selectively switching between a default advertising portion of the multicast content delivery stream and a local or regional advertising stream is extremely difficult within the context of Internet protocol television (IPTV). This difficulty is increased where the characteristics (e.g., length, bit rate and the like) of the default advertising portion and local/regional advertising streams are different or unknown.

Start over services are known, In such a service, a user may decide to watch a program after the program has already begun, such as 15 minutes after the start of a 30 minute program. The start over service provides a stream to the user including the program such that the user can view the program in its entirety (i.e., restart the program viewing process). Such a service is typically available for a limited amount of time, such as until the end of the normal or scheduled broadcast time of the program.

SUMMARY

Various deficiencies of the prior art are addressed by a method and apparatus providing for the insertion of targeted/addressable advertisement within the context of a start over service.

In one embodiment, a method for delivering targeted advertising to an Internet Protocol television (IPTV) client comprises receiving from a client a start over request for a current multicast stream; retrieving from a storage device a cached copy of the requested multicast stream; forwarding the cached copy of the requested multicast stream toward the requesting user; monitoring the cached copy of the requested multicast stream to detect therein a splice-in point associated with a default advertisement; providing, in response to said detection, a replacement advertisement within a unicast stream adapted to be received by the client; and transmitting toward the client a command adapted to cause a channel change mechanism within the client to select the unicast stream for processing at a time contemporaneous with the detected splice-in point.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
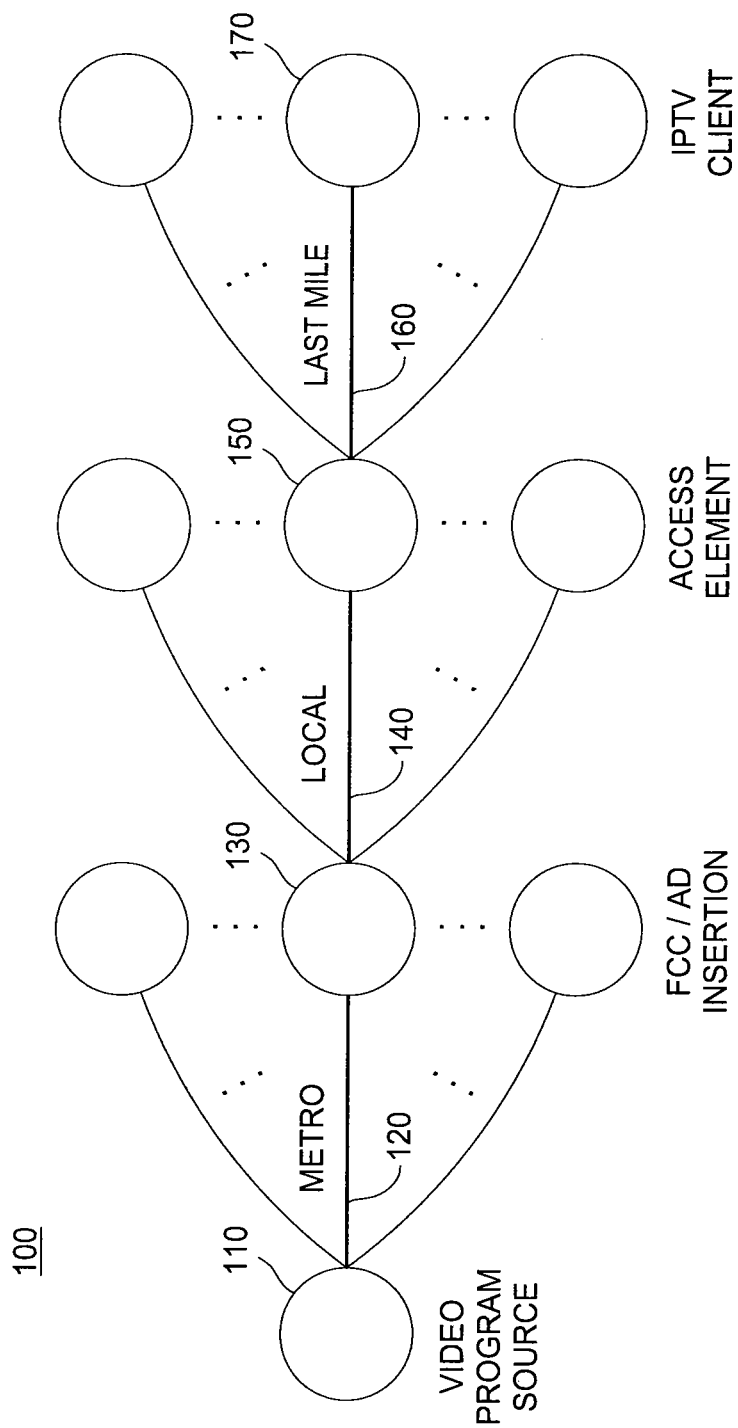
FIG. 1 depicts a high-level block diagram of an exemplary communications network suitable for use with the present embodiments.

Fast Channel Change (FCC) is part of various IPTV offerings. FCC uses a server/client mechanism where the server typically resides in a router and the client resides in IPTV receiver, such as a set top box (STB). During the FCC process, a unicast stream is used for several seconds to deliver a specific video stream to a specific single user (receiver). For targeted advertising, a dedicated video stream needs to be delivered to a single user, for several minutes. Although the duration of the FCC and targeted advertising delivery is different, the bandwidth adaptation techniques associated with seamless splicing is similar.

More generally, the inventors have determined that one or more of the bandwidth adapting/management mechanisms typically present within a client/server environment such as the IPTV environment may be advantageously utilized to provide target advertising. Thus, while the present disclosure generally describes an FCC mechanism, it will be appreciated by those skilled in the art and informed by the teachings of the present invention that other mechanisms enabling stream transitions at a client device, bandwidth management functions, burst and/or constrained bit mode operation and so on may be advantageously utilize to provide targeted advertisement.

The invention is directed to enabling targeted/addressable advertising using the bandwidth normally allocated to a bandwidth adapting/management mechanism (such as FCC) or using the mechanism itself. Within the context of the present invention, such a mechanism is optionally augmented with an additional capability to enable temporary substitution of a different video stream, possibly containing advertising content, in a unicast stream or sub-VLAN stream. This temporary stream carries targeted/addressable advertising based on the client profile that is getting a specific unicast stream. In one embodiment, the multicast and unicast streams have the same address such that the transition from one to the other at the client device is made without a reselection/requisition process. In this embodiment, the client device (e.g., set top box) treats the unicast stream in the same manner as the multicast stream, thereby facilitating a rapid transition between streams.

In one embodiment, it is assumed that a TV service provider will be able to offer a base level of advertisement insertion for all viewers of a particular TV stream. This insertion may be accomplished using the insertion technology described here.

Generally speaking, it is assumed that a TV viewing population may be differentiated via several known techniques, including client/user association with a particular geography or network aggregation/disaggregation point. If there are sufficient network resources it is also assumed that it is possible to further differentiate viewers on the basis of complex criteria. These three layers of advertising rely on the same insertion signals provided in the video stream, such as SCTE-35 standard. Other insertion signals, such as SMPTE in-points and out-points may be utilized. The varying complexity of view differentiation is accompanied by varying network bandwidth requirements, such that in various embodiments advertisement or other streams are inserted on a regional layer rather than a targeted layer. This choice is optionally managed by a resource manager.

Resource Management

FIG. 1 depicts a high-level block diagram of an exemplary communications network suitable for use with the present invention. Specifically, a video program source 110 provides video programming to at least one Ad insertion server 130 via a metropolitan communication path 120. Each Ad insertion server 130 provides video programming to at least one access element 150 via a respective local communication path 140. Each access element 150 provides video programming to at least one IPTV client 170 via a last mile communication path 160. It will be appreciated by those skilled in the art that multiple video program sources 110 as well as various changes to the depicted topology are contemplated by the inventors as being within the scope of the present invention.

There are typically bandwidth capacity limits in the network responsible for delivering ads. In the embodiments discussed herein, the main video programs/content are distributed (e.g., multicast) from the video program/content source via a long-haul or metro link 120. The alternate streams are transmitted over one or more local links 160 to the clients. Because the alternate streams (or advertising) are delivered via unicast, they typically increase the loading of the local or last mile links 160 shown in the diagram. In the case of a large number of simultaneous advertising insertions, there may be link oversubscription and consequent loss of video service or quality of service (QoS). To alleviate this condition, an optional resource management function is implemented in, for example, an Ad insertion server 130. Therefore, in one embodiment a resource management function is provided within an Ad server. The resource manager monitors link (or video queue) utilization using, for example, a simple network management protocol (SNMP). If the utilization level exceeds a predefined threshold, then the Ad server allows the default advertising to be provided to the client via the multicast stream, rather than requiring the client to change to a unicast advertising stream.

Figure 2:
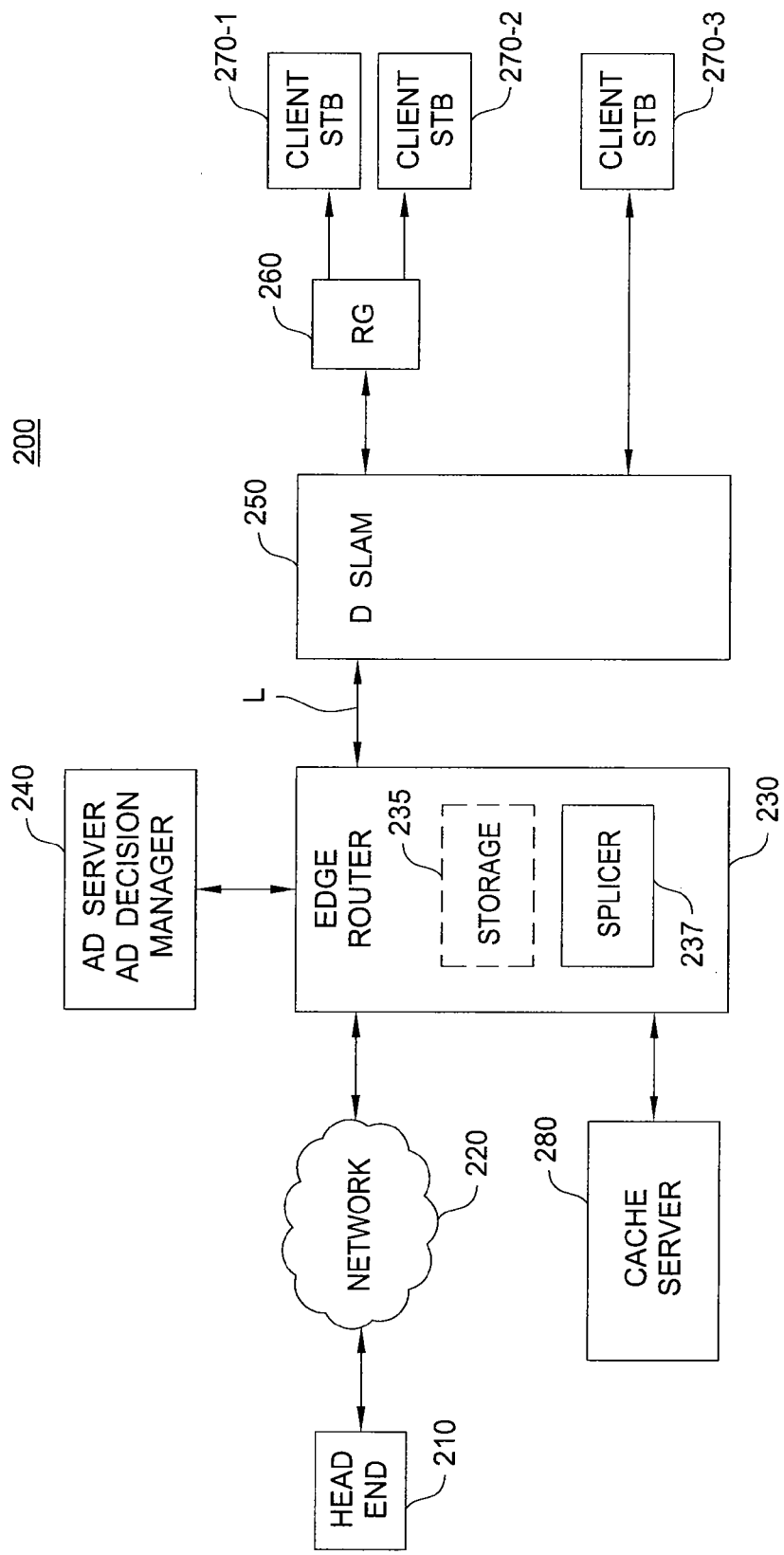
FIG. 2 depicts a high-level block diagram of a system benefiting from the present invention.

FIG. 2 depicts a high-level block diagram of a system benefiting from the present invention. Specifically, the system 200 of FIG. 2 comprises a head end 210, a network 220, at least one edge router 230 (e.g., a switch), an advertisement server/decision manager 240, at least one access node 250 (e.g., a DSLAM), an optional residential gateway (RG) 260 and a plurality of client set-top boxes denoted as 270-1 through 270-3 (collectively client STBs 270).

Generally speaking, multicast and/or unicast content streams are provided by the head end 210 to the client set-top boxes 270. The content streams may be broadcast to multiple clients or narrowcast to specific/requesting clients. Thus, a content stream provided by the head end 210 traverses the network 220, the edge router 230, the access node 250 and, optionally, the RG 260 before being received by a client STB 270.

The content streams provided by the head end include default advertising as discussed above. The advertising may be provided in 30 second, 60 second or other time increments. Each portion of a content stream including default advertising is delineated by input and output splice points. In this manner, local, regional, targeted/addressable and/or client-requested advertising may be spliced into the content stream delivered to a client in a substantially seamless manner.

Advertising content to be spliced into a content stream is stored in the advertisement server/decision manager 240. A storage device 235 operating as an advertising server is optionally included within the edge router 230. In one embodiment, storage device 235 receives from advertising server 240 those advertising streams intended for presentation at the STBs 270 associated with the respective edge router. In another embodiment, storage device 235 receives advertising streams provided by a remote advertising server (not shown) via the network 220. Generally speaking, the advertising streams may be stored in any storage device accessible to a network element such as a router or other splicing mechanism operating in accordance with the various embodiments.

As will be discussed in more detail below, the storage device 235 may also be used to cache multicast streams and/or other content streams for use within the context of a start over system. Moreover, a cached server 280 located external to the edge router 230 may also be implemented to store cached multicast streams.

The edge router 230 operates according to the methodologies described herein to replace the advertising and content portions of multicast streams with more precisely targeted advertising. The edge router 230 optionally includes a splicer 237 operative to splice multicast and/or unicast streams as also discussed herein. The edge router 230 communicates multicast and/or unicast streams to the access node 250 via a communications link L. The access node selectively communicates either a multicast stream or a unicast stream to each client STB 270.

In normal operation a multicast stream including, for example, a network feed or other program including advertising is received from the network 220 by the edge router 230 and forwarded via the access node 250 to multiple client devices 270 for decoding a presentation. The multicast stream is characterized by a particular packet id structure, particular group of pictures structure, particular bit rate and so on.

To replace advertising content within the multicast stream for one or more clients, a unicast stream is transmitted to the one or more clients beginning at a time contemporaneous with or slightly before the splice in point associated with the advertising content. Transmission of the multicast stream to the one or more clients is interrupted at this time. The unicast stream is characterized by the packet ID structure, group of pictures structure bit rate and so on associated with the multicast stream such that the client device continues decoding and presenting content within the unicast stream in the same manner it had been decoding and presenting content within the multicast stream. In one embodiment, the multicast and unicast streams have the same address such that the transition from one to the other at the client device is made without a reselection/requisition process. In this embodiment, the client device (e.g., set top box) treats the unicast stream in the same manner as the multicast stream, thereby facilitating a rapid transition between streams.

To "return" to the multicast stream, transmission of the multicast stream to the one or more clients begins at a time contemporaneous with or slightly before the splice out point associated with the advertising content. Transmission of the unicast stream to the one or more clients is interrupted at this time.

In an embodiment where the bandwidth of the access node to client link is sufficient, multiple multicast and/or unicast streams are provided to a client device 270. In this embodiment, the client may itself transition between streams. The trigger to the client to transition between streams is provided by the advertisement server/decision manager 240, edge router 230 or access node 250 in response to, for example, the detection of SCTE-35 splice points.

In one embodiment, a fast channel change or other mechanism is employed to effect the transitions between multicast and unicast streams. In this embodiment, the multicast and unicast streams are treated as separate channels from the perspective of the channel change mechanism built into the particular IPTV platform. The channel change (channel trigger) condition is invoked to effect splicing into and out of the multicast stream to cause decoding/presentation of the targeted advertising.

In one embodiment, advertisements are automatically selected for a particular client based upon the client profile. However, in this embodiment the client receives only one stream, which has been processed by a router, switch, AN (access node) or other device. That is, the client continues to receive and process a content stream which has been modified to include the appropriate advertising. Thus, client awareness of the advertising insertion is not necessary to provide such advertising.

The above embodiments may be modified by enabling user selection of a particular advertisement to be spliced in. In this case, the targeted advertisement is an interactive advertisement in which the user selects which of a plurality of advertisements he or she would like to view. The length of the advertisement is compared to the default advertisement length and suitable buffering/processing is performed, as discussed herein with respect to FIG. 4. Thus, padding the content stream and/or time shifting the content stream is used to effect a substantially seamless presentation of advertising content to the user.

Advertising streams may be preloaded or stored in a splicing entity (e.g., a router, switch or other device performing the splicing operation). Advertising streams may also be stored in advertising servers or remote servers as needed.

An apparatus according to one embodiment for use in an Internet protocol television (IPTV) system comprises a server, for storing advertising associated with a client device; and a packet directing device, for directing multicast stream packets toward the client device and, in response to a detection of a splice-in point associated with a default advertisement in a multicast stream, for directing advertising stream packets and control packets toward the client device, the control packets identifying the advertising stream packets, an advertising splice-in time and advertising splice-out time.

In various embodiments, servers, clients, routers, access elements and/or other network elements discussed. Each of these network elements comprises at least one processor, various support circuitry, input-output (I/O) circuitry, memory, communication buses and so on for receiving, processing, providing and/or exchanging information.

The at least one processor may be any conventional processor for executing programs stored in memory. The memory may be any conventional volatile memory (e.g., RAM, DRAM, among others), non-volatile memory (e.g., disk drives, floppy, drives, CDROM, EPROMS, among other computer readable medium) or any other conventional memory device for storing data and various control programs, such as methodology according to the present invention.

The processor cooperates with conventional support circuitry, such as power supplies, clock circuits, cache memory and the like, as well as circuits that assist in executing the various programs and routines, as well as other programs and data. As such, it is contemplated that some of the process steps discussed herein as software processes may be implemented within hardware, for example, as circuitry that cooperates with the processor to perform various steps. The input/output (I/O) circuitry forms an interface between the various functional elements communicating with each network element.

Although each network described herein is depicted as a general-purpose computer that is programmed to perform various control functions in accordance with the present invention, the invention can be implemented in hardware such as, for example, an application specific integrated circuit (ASIC). As such, it is intended that the processes described herein be broadly interpreted as being equivalently performed by software, hardware, or a combination thereof.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, and/or stored within a working memory within a computing device operating according to the instructions.

Layered Advertising Insertion

TV content providers will typically insert advertisements into their programs. Often the broadcasters (or TV service providers) make arrangements with the content providers to have advertisement slots made available for advertisement inserts. These slots (avails) can be sold to advertisers and the avails are filled "locally" by the TV service providers. Because the potential revenue derived from selling "avail" advertisement space is high, it is highly desirable for the TV service provider to effectively manage the avail inventory.

According to one embodiment, it is assumed that a TV service provider offers a base level of advertisement insertion for all viewers of a particular TV stream. The viewing population may be differentiated on using simple criteria such as geography or network aggregation/disaggregation point, or using more complex criteria such as demographic information, usage history, preferences and the like. Various techniques are known for determining which advertisements are appropriate for which users. These layers of advertising rely on the same insertion signals provided in the video stream. The varying complexity of viewer differentiation is accompanied by varying network bandwidth requirements, such that at times a choice is made to insert regional layer advertising rather than user-targeted advertising. This choice is managed by the resource manager described below.

Fast Channel Change (FCC)

In a FCC implementation, when a client wishes to change from an "old" channel to a "new" channel, the client will first issue an internet group management protocol (IGMP) "leave" command for the old channel. The client then issues a Real-time Transport Control Protocol (RTCP)-based FCC request to the FCC server for a unicast stream of the "new" channel. When the FCC server detects that the unicast stream is approximately synchronized with the multicast stream, a switchover message is provided in the unicast stream to the client. The client then "joins" the multicast equivalent of the stream, at approximately the same time as the server ceases transmission of the unicast stream. If a unicast stream is not available or is not received by the client, a timer will automatically switch the client to multicast and normal channel change will have taken place.

Because a unicast stream (or any stream entered or "spliced into") begins with a key frame such as an Intra-Coded or I-Frame, the client assumes that it will be permissible to decode and begin playback as soon the first frame has been received, and that no special buffering will be required to manage the playback. The client optionally includes a capability of adjusting a relative playback speed of the unicast and multicast streams so that the unicast stream can eventually be discarded in favor of the identical multicast stream in a substantially seamless manner. In one embodiment, this is handled by the server bursting the stream at quicker-than-normal rates. The switch back to multicast decoding and playback will typically require several seconds.

Modification to Support Targeted/Addressable Advertising Insertion

In one embodiment, the client receives notification that stream substitution shall occur in the multicast and simultaneous unicast streams. This information is retrieved by a splicer within the router (or other access node/access device) from the SCTE-35 data or from the real-time protocol (RTP) extension of an incoming video stream, or directly from the incoming video (e.g., a Transport Stream-TS). In one embodiment, the notification takes the form of a signal (in the RTP header) identifying the means of obtaining the substitute stream such as a uniform resource locator (URL) or uniform resource indicator (URI) and further identifying the time when the stream should be substituted. When the client receives the notification and the time is appropriate, it will act as if it has changed channels in the FCC manner. It will issue an IGMP leave for the channel, and then issue an RTCP request for the alternate/ad stream. The client will play the advertisement stream until it is instructed to switch to multicast.

Channel Change Into Ad

The primary channel carries the "zone" or default advertising during the available times for advertisement insertion by the local operator. The client might change channels during targeted/addressable ad. If the client changes channels away from targeted/addressable advertisements, then normal FCC will apply. If the client changes channels into an advertisement, then it plays the advertisement stream rather than the primary stream. This advertisement will be the "zone" or default advertisement for this specific channel, and not the targeted/addressable advertisement it got before the switch.

Notification Implementation

The client notification is embedded, illustratively, in the RTP header of the multicast stream. In response to detecting a client notification, the client requests a unicast advertising stream (either FCC or secondary) via RTCP. The server maintains a database of client—secondary stream definitions such that the appropriate advertising streams are provided to the client.

Client Profile Association

There are several options for controlling the client-to-alternate-stream association. In one embodiment, the client obtains its custom identity or profile at boot time. The identity provides the client with an association to a specific demographic or targeting group. The association enables the client to find the URL of the substitute stream. In a second embodiment, the client receives a profile identify prior to the stream substitution, separately transmitted "out of band". In a third embodiment, the client queries a server for its identity. The server maintains the client ID—to target/demographic/profile identity relationship. The Ad server maintains the profile-to-stream relationship, for maximum compatibility with the various mechanisms such as FCC implementations and/or other stream switching implementations. Moreover, while the FCC mechanism is the primary mechanism discussed herein, any bandwidth adapting/management mechanism useful in implementing the methodologies and techniques described herein may be used in place of the FCC mechanism.

Interactive Extension

We propose an additional feature enabling interactivity and audience metering. In this extension, a client would receive a notification (as above) that indicates an imminent stream substation opportunity. The user (interacting with the client) would be presented with a visual overlay providing several optional alternate streams. The alternate stream chosen (or the default stream, if none is chosen) would be played at the appropriate ad-insert time. User selection would be transmitted to the audience metering system for later billing data.

Changing Between Multicast and Unicast Streams

The client will send an IGMP leave message to disconnect from the current multicast stream. The client will then send an RTCP based FCC request to the server and set an internal timer based on the network round trip time. This timer's expiration time can be provisioned on the client. If the timer expires the client can choose to re-issue another request or send an IGMP join message to perform normal channel change. There can be two reasons the client times out: (1) The RTCP message was lost due to unreliable UDP; and (2) The server could not satisfy the request due to resource limitations.

In lieu of utilizing RTCP ACK/NACK based messages between the client and server, it was observed that if the FCC server receives a request, simply sending (or stopping) the RTP data is a timely and practical means of acknowledgement. This also greatly simplifies the complexity of the client state machine and reduces the number of timers that would be required when using unreliable RTCP messages.

After sending the FCC request, the client will listen for packets arriving via unicast. When those packets are received, the internal timer is cancelled. The client then uses the RTP packet header extensions to process them appropriately. It also examines them for information regarding rendezvousing back with the multicast stream.

The FCC server is responsible for sending the unicast stream to the client using either a bursting scheme or a denting scheme in order to catch up. Bursting is the case where data is transmitted to a receiver at a higher than normal rate. Denting is the case where less than the normal amount of data is transmitted to a receiver (e.g., the amount of data nominally representing content is reduced). Since the model is "Forward and Store", the server can accurately determine where the unicast and multicast flows are respectively to one another.

The transition from the unicast to the multicast stream involves two actions: (1) The FCC server stops sending the unicast stream; and (2) The client joins the multicast stream and begins receiving multicast packets.

If bursting is not allowed, the FCC server stops the unicast stream before the client begins receiving the multicast stream in order to avoid overloading the connection. Since the FCC Server uses a forward-and-store model, it is always "behind" the multicast stream, hence the last "dent" will be the one between the last unicast packet and the first multicast packet. The FCC server should time the transition so that the client should be able to join the multicast stream at a point where it can begin decoding correctly.

If bursting is allowed, the FCC Server continues sending unicast packets, at a lower bit rate, after the client joins the multicast stream, and thus fill in the gap between the unicast and the multicast.

In either case, the FCC server has to signal to the client when each of these actions should take place. This signaling can be done out-of-band using a RTCP message, or in band via an extension to the RTP header.

When the server wishes to alert the client that it is time to leave the unicast stream and join the multicast group, it will do by signaling in the RTP header extension over several packets. This is referred to as a count down. This method was chosen instead of using unreliable RTCP messages because it greatly simplifies the complexity of the server state machine and reduces the number of timers that would be required.

If the client wishes to stop receiving the unicast stream, it may send a RTCP BYE message to the server. No longer receiving unicast RTP packets is a strong indication the server has stopped sending. Similar to the client request mechanism, a single timer can be used to re-issue a stop request.

Figure 3A:
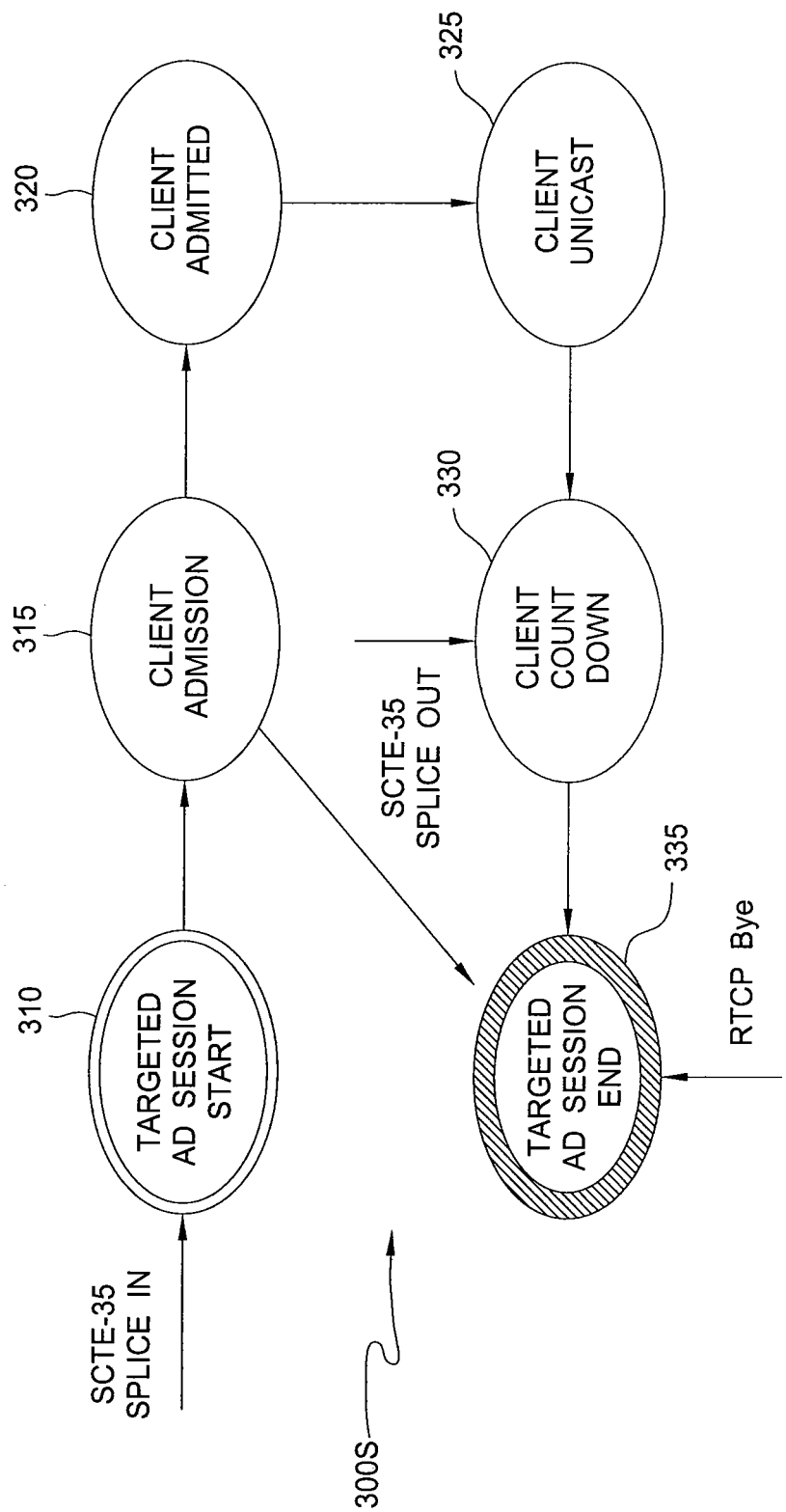
FIG. 3A depicts a state diagram of a server according to an embodiment of the present invention.
Figure 3B:
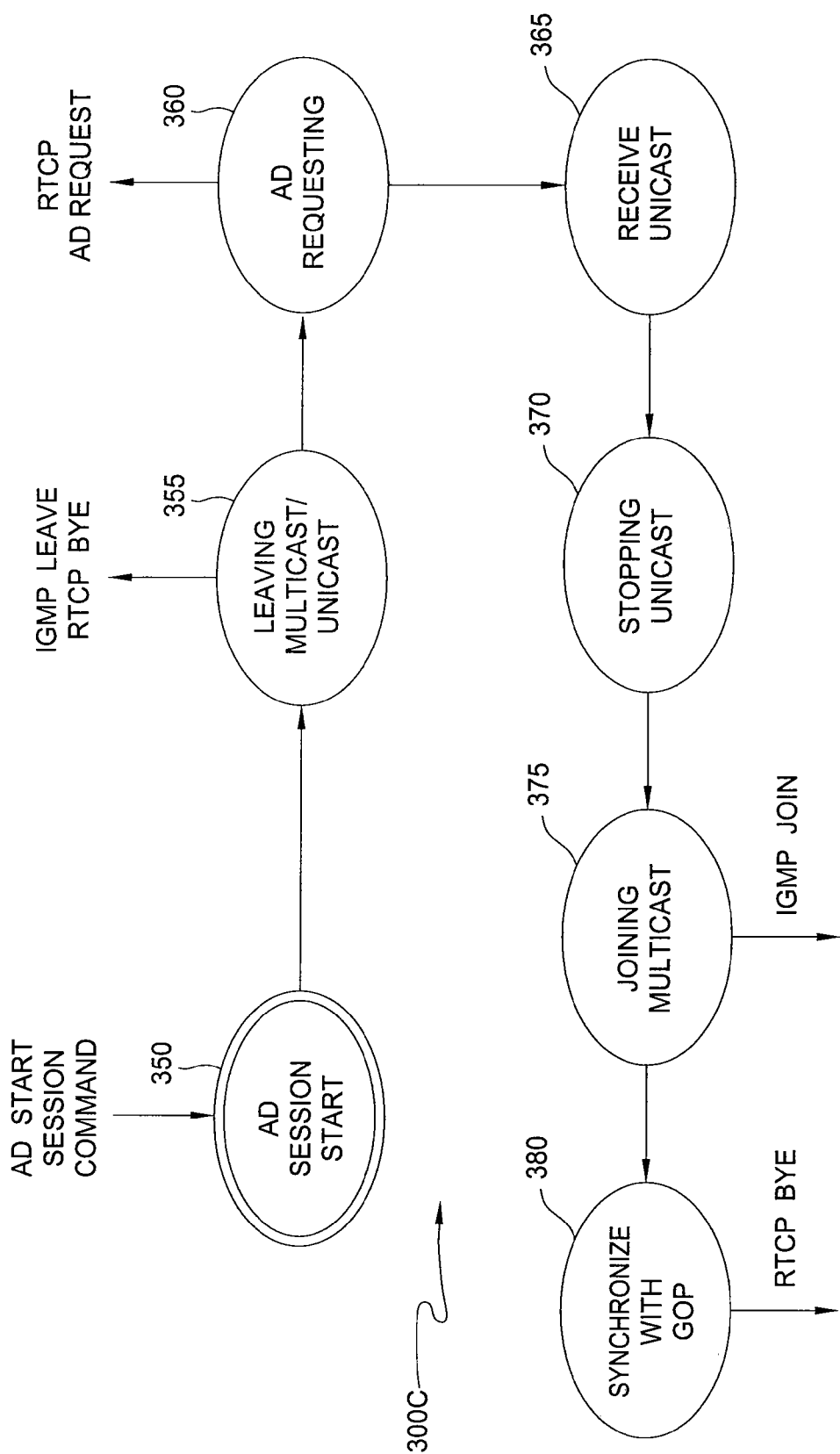
FIG. 3B depicts a state diagram of a client according to an embodiment of the present invention.

FIGS. 3A-3B graphically depict state diagrams for a Fast Channel Change (FCC) server/client operations. FIG. 3A depicts a state diagram of a server according to an embodiment of the present invention.

Specifically, referring to FIG. 3A, a server state diagram 300S is provided in which a server (e.g., an edge router) normally operates in a server steady state where packets associated with a multicast stream are forwarded to clients. Optionally, the packets are copied to a circular buffer for later retrieval by any of a number of IPTV mechanisms using time shifting, buffer management or other functions. The server enters a state denoted as "Targeted Ad Session Start" 310 in response to the detection of an SCTE_35 splice-in point within the multicast stream. In this state, the server creates advertisement session specific elements to support a client channel change operation.

The server then initiates a new state denoted as "Client Admission" 315. While in the "Client Admission" state, the server will evaluate if the necessary resources such as available bandwidth, processing power and the like are available to provide the advertising insertion service. If there are sufficient resources, the server will transition to a new state denoted as "Client Admitted" 320. If there are insufficient resources, the server will transition to the state denoted as "Targeted Ad Session End" 335.

While in the "Client Admitted" state 320, it is the bandwidth as per the multicast stream (no bursting or denting). The server then transitions to a new state denoted as "Client Unicast" 325.

While in the "Client Unicast" state 325, the server will start sending RTP packets via unicast to the client. When the splice out time arrives, the server will then transition to a "Client Count Down" state 330.

While in the "Client Count Down" state 330, the server will re-stamp RTP packets being sent via unicast to include the Packet Identifier and/or Enhancement extension blocks. The server will then transition to the "Targeted Ad Session End" state 335.

While in the "Targeted Ad Session End" state 335, the server will destroy session specific elements supporting the targeted advertising process.

FIG. 3B depicts a state diagram of a client according to an embodiment of the present invention. Specifically, referring to FIG. 3B, a client state diagram 300C is provided. A client steady state is assumed to be a state in which the client device is receiving, via an access node, a multicast stream such as a content stream from a television network or other content source. The client device also receives control signals, messages and the like via in-band and/or out of band signaling. In response to receiving an advertisement start session command transmitted from (illustratively) the server, the client transitions to a starting state denoted as "advertisement session start" 350. On set top boxes or other client devices this state transition causes buffers to be flushed, counters to be reset and so on. The client then transitions to a state denoted as "Leaving Multicast/Unicast" 355.

While in the "Leaving Multicast/Unicast" state 355, the client issues an IGMP leave message if it is receiving multicast traffic or a RTCP BYE message if it is receiving unicast traffic. The client then transitions to a state denoted as "Ad Requesting" 360. When a client receives unicast traffic at its RTP port then the client transitions to a state denoted as "Receive Unicast Stream" 365 where the unicast traffic is received and processed, such as the reception, processing and presentation of advertising.

While in the "Receive Unicast Stream" state 365, the client utilizes the RTP header extensions in order to process the received packets appropriately. This can include various denting and/or bursting algorithms. The client also inspects each received RTP for Packet Identifier and/or Enhancement extension blocks associated with an IPTV mechanism or feature (e.g., FCC) adapted according to the present invention. When the RTP packet containing the appropriate Packet Identifier and/or Enhancement extension block information is received, the client transitions to the "Stopping Unicast" state 370.

While in the "Stopping Unicast" state 370, the client does not necessarily stop processing RTP packets; rather, the client may continue to receive unicast packets in support of overlapped multicast/unicast receiving of a given stream and use the sequence numbers to obtain alignment to facilitate a seamless return of presentation context to the multicast stream. The client then transitions to a state denoted as "Joining Multicast" 375.

While in the "Joining Multicast" state 375, the client issues an IGMP join message and then waits to receive multicast data. When the multicast data is received, the client transitions to a state denoted as "Synchronize with GOP" 295.

While in the "Synchronize with GOP" state 380, the client examines the RTP header extension information inside previously buffered and currently being received unicast and/or multicast packets. Packets with duplicate RTP sequence numbers are discarded. Packets with duplicate RTP sequence numbers and original sequence numbers are discarded. If there is a discontinuity of RTP sequence numbers along with a difference in GOP (Group-of-Picture) number, the first RTP packet with the next GOP number is examined for Group Entry Point header extension. If it is not found, this indicates the RTP packet containing the information for the GOP has been lost. The client may then perform a retransmission request. Or the client may selectively drop incoming multicast RTP packets until it a Entry Point header extension is found. The client optionally issues a stop message if it is still receiving unicast after transitioning back to the multicast stream.

Figure 4:
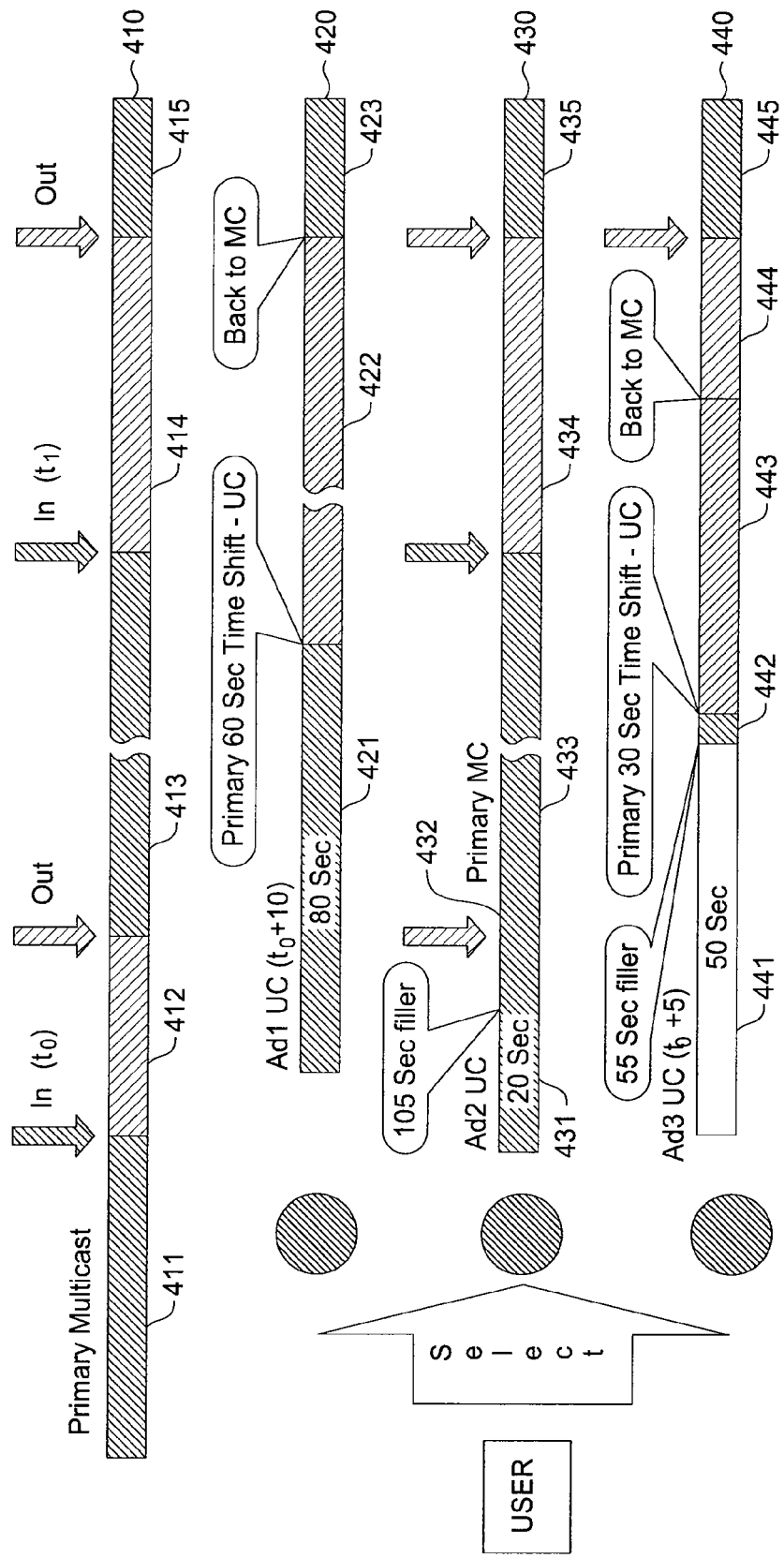
FIG. 4 depicts a graphical representation of multicast and unicast streams useful in understanding the present invention.

FIG. 4 depicts a graphical representation of multicast and unicast streams useful in understanding the present invention. In this scenario, the user selects the ads to be viewed. This selection is made during a predefined period of time after a window of an avail (spot for targeted ads) is provided.

Specifically, FIG. 4 depicts a primary multicast stream 410 having associated with it a plurality of temporally ordered segments or portions including a first content portion 411, a 30 second advertising portion 412 delineated by a splice-in point at a time to and a first splice-out point, a second content portion 413, a 60 second advertising portion 414 delineated by a splice-in point at a time $t_1$ and a second splice-out point, and a third content portion 415.

FIG. 4 also depicts first 420, second 430 and third 440 spliced streams. Each of the spliced streams represents the stream components processed by a client after splicing a unicast advertising stream into the 30 second advertising portion of the primary multicast stream.

Where the amount of advertising in the unicast stream is less than 30 seconds, filler is used to "pad" the advertising to equal 30 seconds. In this case, the client returns to processing the primary multicast stream at the first splice-out point.

Where the amount of advertising is greater than 30 seconds, time shifting of a non-advertising portion of the primary multicast stream is used. In this case, the client returns to processing the primary multicast stream at the second splice-out point. Portions of the default 60 second advertising portion of the primary multicast stream may not be processed by the client. In this case the original content including the national or default advertising is preserved, First splice stream 420 is a result of splicing an 80 second unicast advertisement into the 30 second advertising portion of the primary multicast stream 410. Specifically, first spliced stream 420 comprises a first portion 421 including 80 seconds of unicast advertising that begins to be processed by the client at a time $t_0+10$ seconds, a second portion 422 including content time shifted by 60 seconds, and a third portion 423 including multicast stream content beginning at the second splice-out point.

Second splice stream 430 is a result of splicing a 20 second unicast advertisement into the 30 second advertising portion of the primary multicast stream 410. Specifically, second spliced stream 430 comprises a first portion 431 including 20 seconds of unicast advertising that begins to be processed by the client at a time $t_0$, a second portion 432 including 10 seconds of filler, and third 433, fourth 434 and fifth 435 portions including multicast stream content beginning at the first splice-out point.

Third splice stream 440 is a result of splicing a 50 second unicast advertisement into the 30 second advertising portion of the primary multicast stream 410. Specifically, third splice stream 440 comprises a first portion 441 including 50 seconds of unicast advertising that begins to be processed by the client at a time $t_0+5$ seconds, a second portion 442 including five seconds of filler, a third portion 443 including content time shifted by 30 seconds, and fourth 444 and fifth 445 portions including multicast stream content beginning 35 seconds into the 60 second advertising portion of the multicast stream.

Specifically, in one embodiment the length of the targeted advertisement is compared to the length of an advertising slot within a content stream. Time shifting of the primary channel or content stream is used to accommodate a targeted advertisement that is longer than the advertising slot within which it is inserted. A router, switch or other device (e.g., access node) providing the splicing functionality will process the time shifted primary channel as long as at least one user is receiving this channel. If the last client catches up to the primary channel, a time shifted primary channel is no longer needed for the interactive advertisement (though it may be used for standard time shifted television viewing).

Figure 5A:
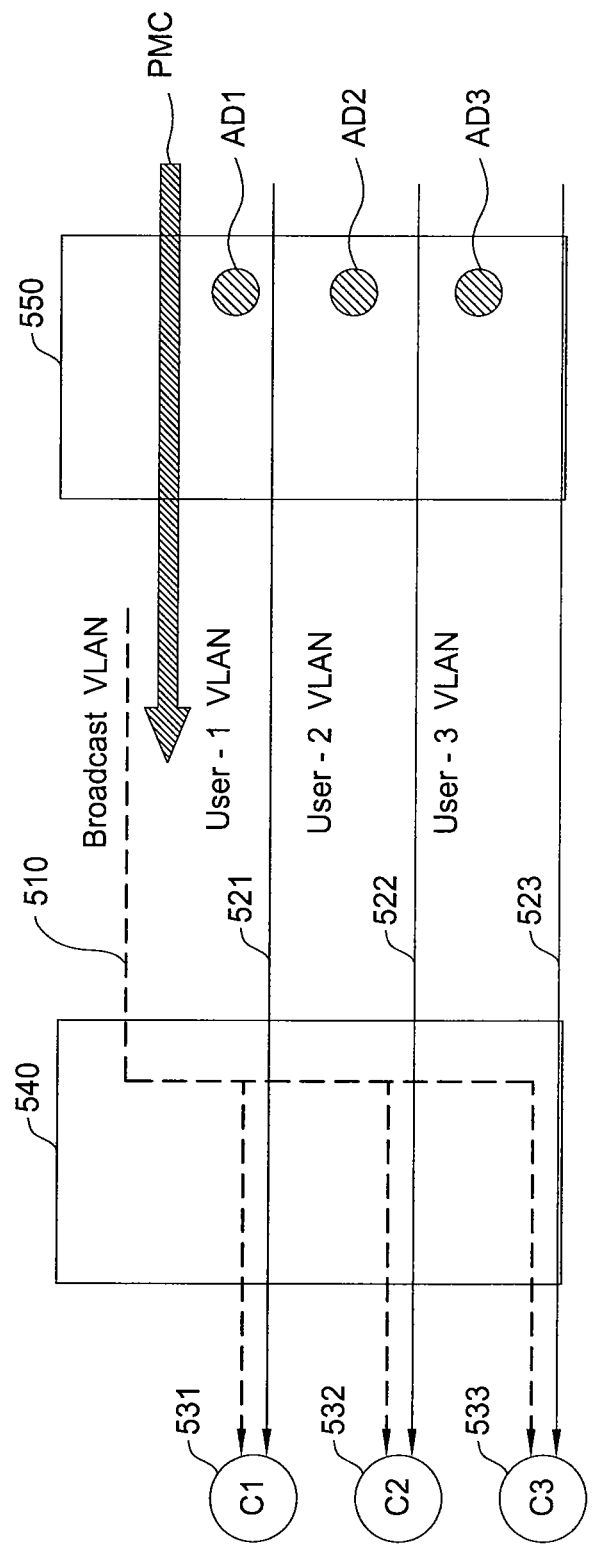
FIG. 5A depicts a graphical representation of multicast content delivery via broadcast virtual local area network (VLAN)
Figure 5B:
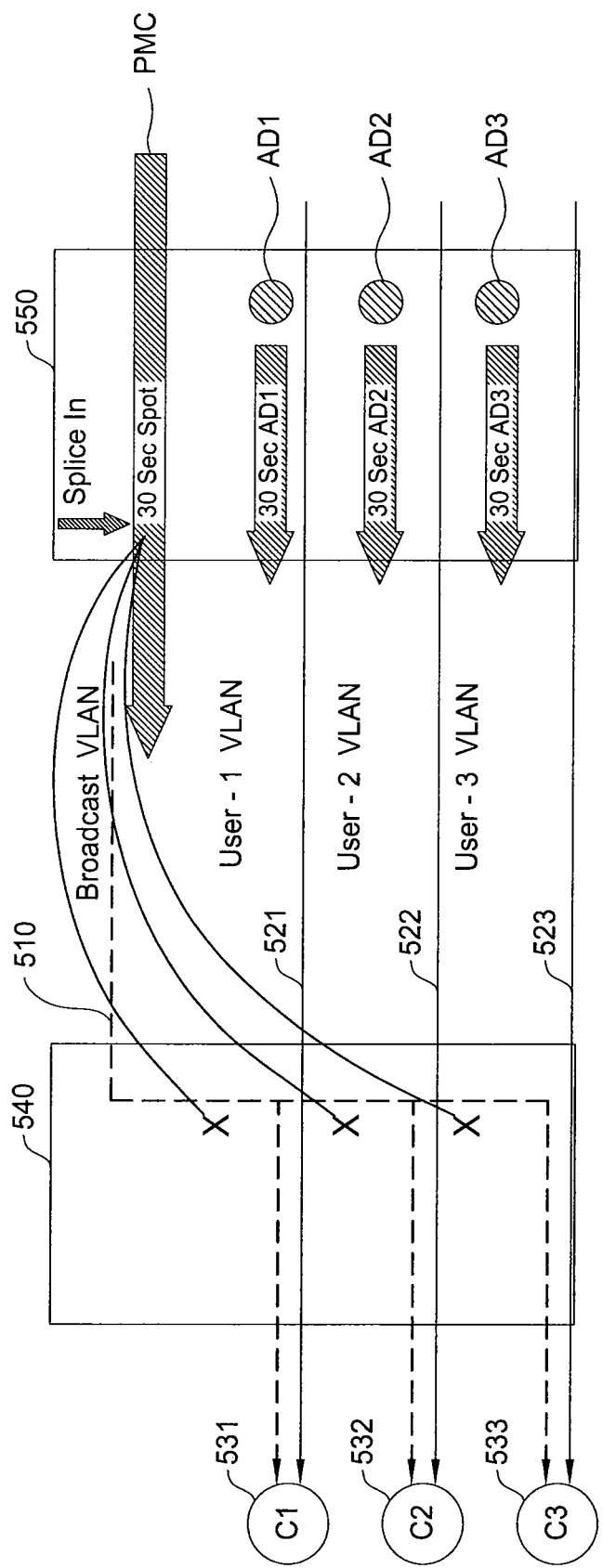
FIG. 5B depicts a graphical representation of an exemplary transition from multicast content delivery via broadcast VLAN to unicast/multicast with targeted advertisement content delivery via sub/user-VLAN.

FIGS. 5A-5B depicts graphical representations of multicast content delivery via a broadcast virtual local area network (VLAN). Specifically, a primary multicast channel (PMC) such as the Cable New Network or other television feed is delivered via a broadcast virtual local area network (VLAN) 510 to each of a plurality (illustratively three) of clients 531-533. Each of the clients 531-533 further receives various services via a respective user or sub-VLAN 521-523. Such services may comprise, illustratively, video on demand, FCC, high-speed Internet, voice over IP (VoIP) and the like. Thus, each sub-VLAN has one or more services consuming bandwidth.

The broadcast VLAN 510 and sub-VLANs 521-523 are coupled to the clients 531-533 via a digital subscriber line access multiplexer (DSLAM), illustratively a Model 7330 Alcatel-Lucent DSLAM (though other DSLAM-type products may be used). The DSLAM receives data from a router or switching device 550, such as a Model 7450 Alcatel-Lucent switch (though other switch-type products may be used).

In an embodiment, the primary multicast channel is propagated to each client 531-533 via the broadcast VLAN while targeted advertising AD1-AD3 is propagated to each client 531-533 via its respective sub-VLAN 521-523. To deliver the targeted advertising to the client, a transition from the primary multicast channel to the targeted advertising is performed at a splice-in point within the primary multicast channel. This results in sending the targeted ads via the sub-VLAN, and optionally uses in-band information to notify the DSLAM to stop replicating the PMC to those specific customers. After the targeted advertising has been presented at the client, a transition from the targeted advertising to the primary multicast channel is performed at a splice-out point within the primary multicast channel.

In one embodiment, replication start/stop commands may be embedded in the multicast and/or unicast streams, such as in RTP headers or other portion of the streams. In another embodiment, a command to start or stop is sent from the client device, a control/management device or a network access device.

Referring to FIG. 5A, the PMC channel is replicated in the DSLAM and sent to each one of the users. That is, the DSLAM replicates the PMC conveyed by the broadcast VLAN for each of the clients 531-533.

FIG. 5B depicts a graphical representation of an exemplary transition from multicast content delivery via broadcast VLAN to unicast/multicast content delivery via sub-VLAN. Specifically, referring to FIG. 5B, the targeted advertising channel is delivered to the client. In this case, the transitions are controlled by router (or switch) and involve the DSLAM. Specifically, upon sensing a splice-in point in the PMC, the router/switch notifies the DSLAM using an in-band or out-of-band command to stop replicating the PMC to specific users where the router has targeted advertising. A new service denoted as MC advertisement, which enables targeted advertising to users within the context of a multicast stream, is provided via a crossconnect in a switch or DSLAM in communication with a client. In this case, since the unicast advertising stream is identified in the same manner as the PMC (i.e., same headers, identification, stream parameters and the like), the STB is not aware that the advertisement is being received using the sub-VLAN from the router/switch to the DSLAM. As such, there is no special processing necessary for the client to receive the targeted ad.

Figure 5C:
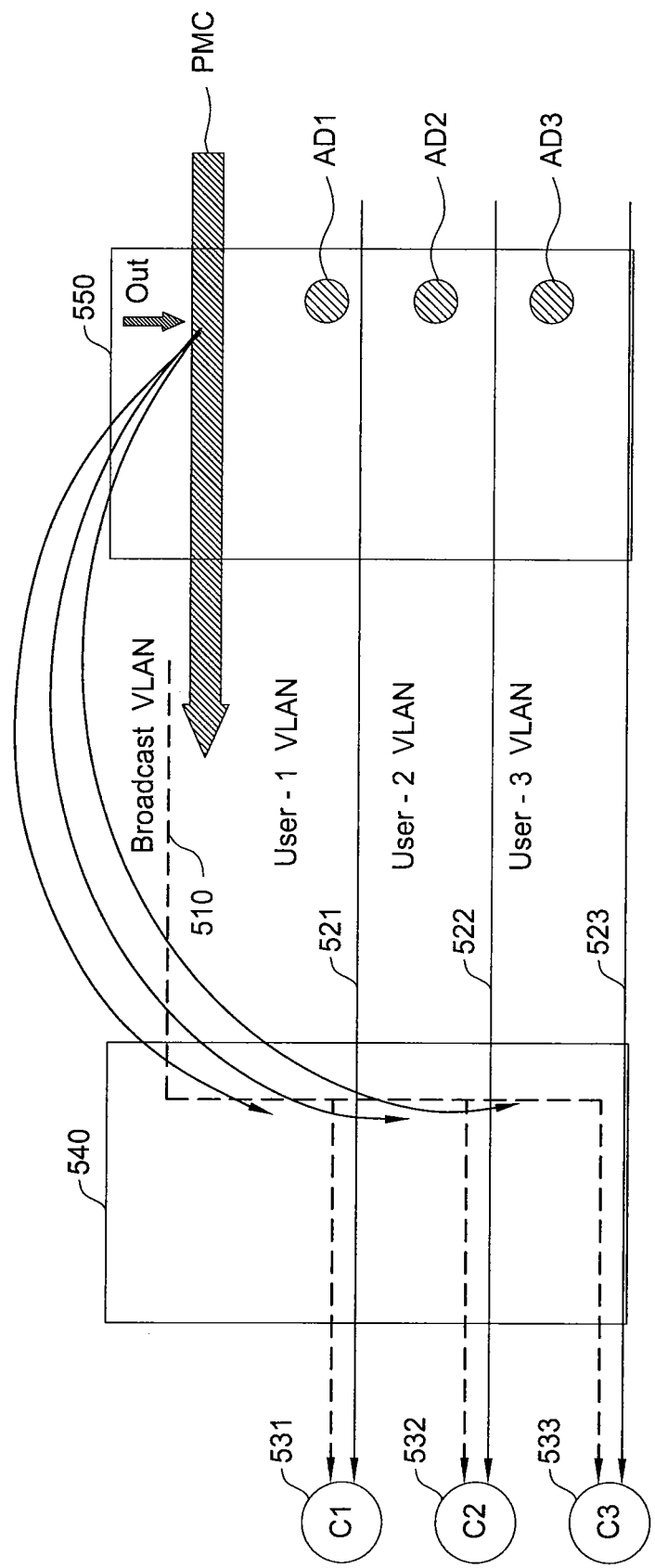
FIG. 5C depicts a graphical representation of an exemplary transition from unicast/multicast with targeted advertisement content delivery via sub-VLAN to multicast content delivery via broadcast VLAN.

FIG. 5C depicts a graphical representation of an exemplary transition from unicast content/multicast delivery via sub-VLAN to multicast content delivery via broadcast VLAN. Specifically, referring to FIG. 5C, upon sensing a splice-out point in the PMC, the router/switch sends an in-band or out-of-band command to the DSLAM to resume replicating the PMC for each client that joins to this specific PMC. In addition, the router stops sending the ads over the sub-VLAN.

In the case where there is enough bandwidth between the router/switch and the DSLAM, at the splice-in point identified by the router/switch the PMC delivery to the DSLAM is stopped and the targeted ads are sent over the sub-VLANs. If a customer/client is not associated with a targeted advertisement, then a primary channel with either the national, local, or zoned (the existing advertisement within the PMC) is sent over the user sub-VLAN. In this scenario there is no need for DSLAM modification and the transition between the PMC and ads is done entirely by the router/switch.

In the case where there is not enough bandwidth in the link L between the router/switch 230 and the Access Node (AN) 250, the advertisement streams are provided as unicast streams to the AN and the AN selects the appropriate advertisement to be provided to the user/client via replication of the specific Ad to different subs. The matching between advertisement and user is done by criteria information received from the router/switch, and the knowledge of what the user is actually watching (based on the IGMP join). The AN will also be notified on time to switch to the targeted Ad based on the selection information delivered from the router/switch. To summarize this approach, the AN will do the actual selection based on information the router/switch extract from the SCTE-35 (splice-in and -out) and the Ad decision service.

The above-described implementations using VLAN/sub-VLAN are readily adapted to video on demand (VOD), high-speed Internet (HSI), voice over IP (VoIP) and FCC functions. In networks where OLT (Optical Line Termination) and ONT (Optical Network Termination) are used (fiber to the home), the same concept is optionally used except that the ONT is responsible for terminating the replication of the multicast stream.

The FCC implementation is one of a plurality of channel change implementations suitable for use with the present invention. Other channel change implementations include the ICC (instant channel change) implementation provided by ATT Corporation of Basking Ridge, N.J. Still other channel change implementations may be used.

Fast Start Embodiments

In one embodiment, the various channel change and/or advertising insertion techniques disclosed herein are utilized within the context of a "start over" service. Specifically, in one embodiment personalized ads are inserted during a start over service within an Internet protocol television (IPTV), cable television or other content delivery service. In such a service, a user may decide to watch a program after the program has already begun, such as 15 minutes after the start of a 30 minute program. The start over service establishes for the user an individual video stream including the desired program (content). The individual video stream may be provided within the context of a video on demand (VOD) function within the IPTV or cable television system. Thus, in response to a user/client request for a current program (i.e., broadcast, multicast, narrowcast and the like), a cached version of the current program including personalized or targeted advertising is streamed to the user.

The start over service is implemented by caching or storing each content stream as it is being broadcast. Each content stream is stored for a predefined period of time $t_{STORE}$, such as an integer multiple of the length of the content stream. For example, a one-hour program is cached and stored for two hours where $t_{STORE}=2$. Thus, even if a user decides to commence to watch the program in the middle of the normal broadcast-prior to the normal termination of the program, the user will be allowed to watch entire program. In one embodiment, the start over service terminates streaming of the cached program upon the expiration of the predefined storage time. In another embodiment, the start over service terminates streaming of the cached program upon the expiration of a predefined viewing time, where the predefined viewing time is less than or equal to length of the program.

In one embodiment, the storage device 235 within the edge router 230 depicted in FIG. 2 is used to cache content streams provided to the DSLAM 250. In this embodiment, edge router 230 performs the various splicing and Ad insertion functions described above with respect to the various Figures. In alternate embodiments, a cache server 280 is employed to cache content streams for a predefined period of time. The cache server 280 of FIG. 2 cooperates with the edge router 230 to perform any stream caching function. However, it will be appreciated by those skilled in the art that the cache server 280 may be coupled directly to the DSLAM 250, contained within the edge router 230 or DSLAM 250, connected to the edge router 230 via the network 220 and so on. Generally speaking, to implement the content cache functions described herein, a storage device capable of caching the various content streams and supplying cached content streams in a timely fashion to the various splicing mechanisms is provided.

Generally speaking, a user or client may invoke the start over service during the normal presentation time of a program delivered as a broadcast or multicast stream. The multicast stream is cached by a storage device. The cache is purged after a predefined period of time. In response to a user request prior to the expiration of the predefined period of time, the cached stream is provided to the requesting user. Default advertisements within the cached stream are identified and optionally replaced by targeted advertisements. Since the cached stream may be delivered as video on demand, more or fewer targeted advertisements may be provided within the stream. These targeted advertisements may replace the default advertisements or be included within the stream in addition to the default advertisements.

Figure 6:
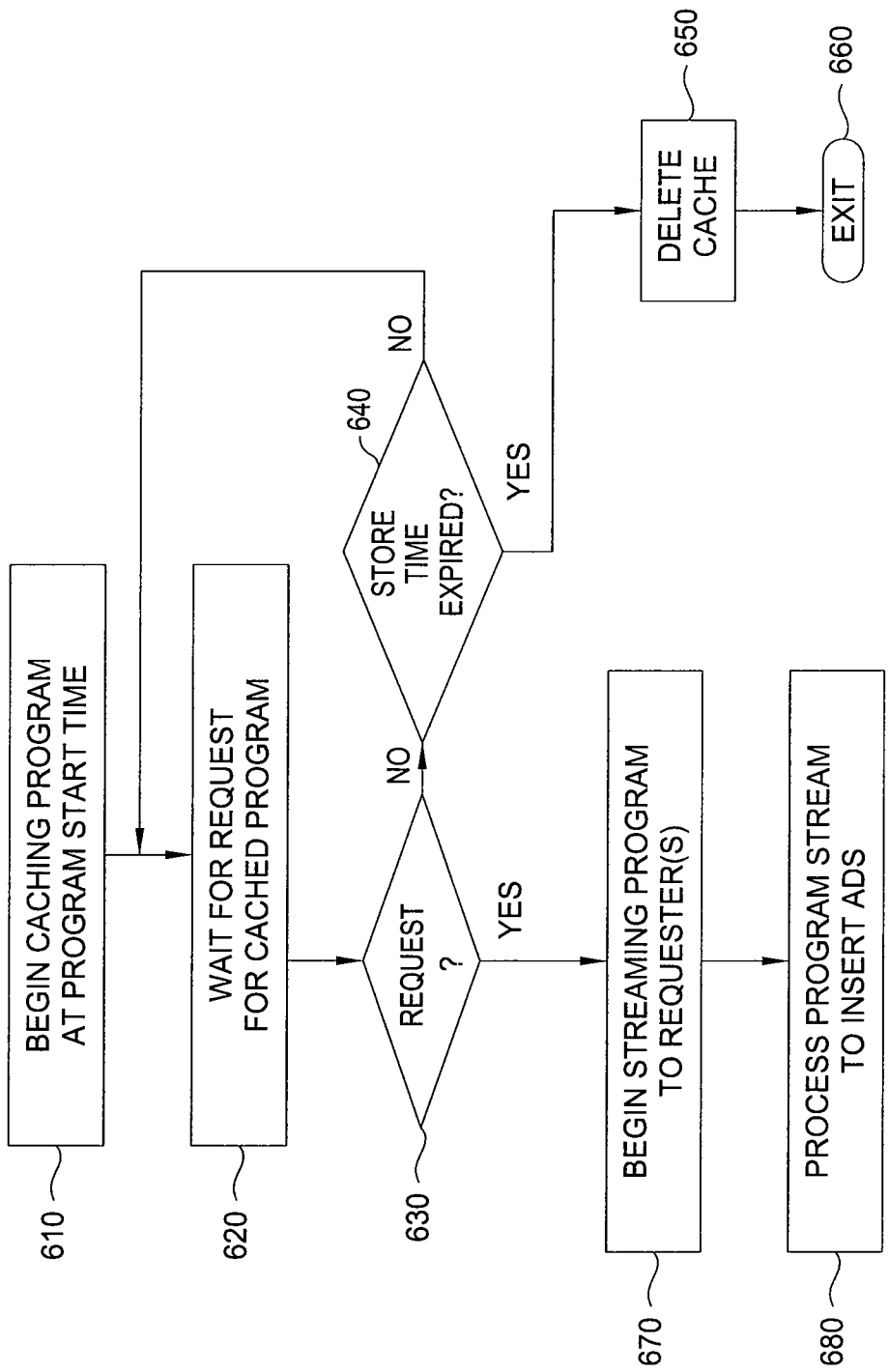
FIG. 6 depicts a flow diagram of a method according to one embodiment.

FIG. 6 depicts a flow diagram of a method according to one embodiment. Specifically, the method 600 of FIG. 6 is entered at step 610, when a program or other content stream being broadcast is cached beginning at the program/content stream start time (e.g., at the start of the transmission of a broadcast or multicast stream). At step 620, the method waits for a request for the cached program from one or more users.

At step 630, a determination is made as to whether a user/client request for the cached program has been received. If the request has not been received, that at step 640 a determination is made as to whether the store time associated with the cached program has expired. If the store time has not expired, then the method 600 proceeds to step 620 to wait for a user request. If the store time has expired, then the cached program is deleted at step 650 and the method exits at step 660. In one embodiment, the store time is an integer multiple of the duration of the cached program.

If at step 630 a determination is made that a user request for a cached program has been received, then at step 670 streaming of the requested program is begun for each requesting user. In one embodiment, a VOD (video on demand) session is initiated for each requesting user.

At step 680, the program/content stream of the requested program being provided to the one or more requesting users is processed to insert advertising. Such processing is performed substantially in accordance with the methods, techniques and systems described above with respect to FIGS. 1-5. In various embodiments, fast channel change mechanisms, multicast to unicast transmission mechanisms, virtual LAN mechanisms and so on are utilized as described above.

The targeted/addressable advertisement insertion techniques described herein are employed to direct advertising to requesting users within the context of a start over service. The program/content streams normally broadcast include default advertising portions which are associated with splice-in points and splice-out points, which points are identified by, illustratively, SCTE-35 indicators. Other splice point indicators may also be used within the context of the various embodiments.

In one embodiment, the start over service described herein is implemented within the context of a network personal video recorder (NPVR) wherein a storage space at a head end is allocated to a user for storage and retrieval of content.

In one embodiment, the start over service described herein is implemented within the context of a near video on demand service, wherein a multicast stream requested in the start over mode is only initiated periodically, such as each minute if requests for the stream are pending. Thus, in one embodiment, a cached copy of a requested multicast stream is transmitted as a multicast stream to each of a plurality of requesting clients. In another embodiment, different instances of the cached copy of the requested multicast stream are transmitted as multicast streams on a periodic basis (e.g., once a minute, once every 5 minutes, etc.)

In one application, advertisements normally pertaining to a next or future program may be out-dated during the start over service viewing time. For example, if a 1:00 PM program includes advertisements for a 2:00 PM program, the advertisements may be out-of-date when a start over service user is viewing the 1:00 PM program at a time later than 2:00 PM. In this case, replacement advertising is an appropriate solution and a revenue producer for the service provider.

In one embodiment, the inserted advertising is longer (or shorter) in duration then the default advertising. In this embodiment, the cached content streams are provided to users as requested, however the default advertising is replaced by targeted advertising of longer or shorter duration. Thus, a 30 second default advertisement may be replaced by a one minute target advertisement. In this manner, additional revenues are generated for the service provider. In this embodiment, the storage time $t_{STORE}$ for the cached content is increased to enable the use of longer advertisements without prematurely terminating program stream into the user.

In one embodiment a method for delivering targeted advertising to an Internet Protocol television (IPTV) client, comprises receiving from a client a start over request for a current multicast stream; retrieving from a storage device a cached copy of the requested multicast stream; forwarding the copy of the requested multicast stream toward the requesting user; monitoring the requested multicast stream to detect therein a splice-in point associated with a default advertisement; providing, in response to said detection, a replacement advertisement within a unicast stream adapted to be received by the client; and transmitting toward the client a command adapted to cause a channel change mechanism within the client to select the unicast stream for processing at a time contemporaneous with the detected splice-in point.

It will be appreciated by those skilled in the art and informed by the teachings discussed herein that the various functional elements described herein in the text and/or figures may be used individually or combined in an alternative manner to achieve the various purposes of the invention.

Although various embodiments that incorporate the teachings of the present invention have been shown and described in detail herein, those skilled in the art can readily devise many other varied embodiments that still incorporate these teachings.

What is claimed is:

1. A method for delivering targeted advertising to Internet Protocol television (IPTV) clients, the method comprising:
   receiving by a server device from a client of the IPTV clients a start over request for a current multicast stream;
   determining that a storage time associated with the requested current multicast stream is not expired;
   retrieving by the server device from a storage device at least one cached copy of the requested current multicast stream;
   inserting by the server device at least one advertisement targeting the client in the retrieved at least one cached copy of the requested current multicast stream by replacing a default advertisement;
   increasing said storage time of the requested current multicast stream to enable using longer advertisement without prematurely terminating said requested current multicast stream, if the at least one advertisement is longer than the default advertisement; and
   transmitting, by the server device, the retrieved at least one cached copy of the requested current multicast stream including the at least one advertisement toward the client.

2. The method of claim 1, wherein the advertisement targeting the client comprises a replacement advertisement is provided by a memory device associated with an edge router.

3. The method of claim 2, wherein the edge router provides the cached copy of the requested current multicast stream to an access node.

4. The method of claim 2 wherein the edge router provides to an access node either the cached copy of the requested current multicast stream or a unicast stream.

5. The method of claim 1, wherein a default advertisement is shorter than a corresponding replacement advertisement targeting the client.

6. The method of claim 5, wherein the default advertisement is longer than the corresponding replacement advertisement.

7. The method of claim 1, wherein the cached copy of the requested current multicast stream is transmitted as a unicast stream toward the client.

8. The method of claim 1, wherein the cached copy of the requested current multicast stream is transmitted as a multicast stream toward each of a plurality of requesting clients.

9. The method of claim 1, wherein different instances of cached copy of the requested current multicast stream are transmitted as multicast streams on a periodic basis.

10. Apparatus for use in an Internet protocol television (IPTV) system, comprising:
    an edge router, for receiving a multicast stream and forwarding the multicast stream toward at least one client device and toward a cache server, and for receiving an advertising stream; wherein said edge router, in response to receiving from a client device a start over request for a current multicast stream, determining that a storage time associated with the requested current multicast stream is not expired, inserting at least one advertisement in a copy of the requested current multicast stream retrieved from the cache server by replacing a default advertisement, increasing said storage time of the requested current multicast stream to enable using longer advertisement without prematurely terminating said requested current multicast stream if the at least one advertisement is longer than the default advertisement, and transmitting the retrieved at least one cached copy of the requested current multicast stream including the at least one advertisement toward the client device.

11. Apparatus for delivering targeted advertising to an Internet Protocol television (IPTV) client, comprising:
a processor;
a non-transitory storage medium for tangibly storing thereon program logic for execution by the processor, the program logic comprising:
logic to receive by a server device from a client of the IPTV clients a start over request for a current multicast stream;
logic to determine that a storage time associated with the requested current multicast stream is not expired;
logic to retrieve by the server device from a storage device at least one cached copy of the requested current multicast stream;
logic to insert by the server device at least one advertisement targeting the client in the retrieved at least one cached copy of the requested current multicast stream by replacing a default advertisement;
logic to increase said storage time of the requested current multicast stream to enable using longer advertisement without prematurely terminating said requested current multicast stream, if the at least one advertisement is longer than the default advertisement; and
logic to transmit, by the server device, the retrieved at least one cached copy of the requested current multicast stream including the at least one advertisement toward the client.

12. A non-transitory computer program product wherein computer instructions stored in a non-transitory computer readable memory, when processed by a computer, adapt the operation of the computer to perform a method for delivering targeted advertising to an Internet Protocol television (IPTV) client, the method comprising:
receiving by a computer from a client of the IPTV clients a start over request for a current multicast stream;
determining that a storage time associated with the requested current multicast stream is not expired;
retrieving by the computer from a storage device at least one cached copy of the requested current multicast stream;
inserting by the computer at least one advertisement in the retrieved at least one cached copy of the requested current multicast stream by replacing a default advertisement;
increasing said storage time of the requested current multicast stream to enable using longer advertisement without prematurely terminating said requested current multicast stream, if the at least one advertisement is longer than the default advertisement; and
transmitting, by the computer, the retrieved at least one cached copy of the requested current multicast stream including the at least one advertisement toward the client.

13. The method of claim 1, further comprising evaluating, by the server device, resources available for performing said inserting at least one advertisement, said inserting being performed where sufficient resources are available.

14. The method of claim 13, wherein the resources include one or more of an available bandwidth and a processing power.

15. The method of claim 13, wherein the stream formed by inserting the at least one advertisement is a unicast stream.

16. The method of claim 1, wherein the at least one advertisement is inserted as a replacement for at least one default advertisement.

* * * * *